(12) United States Patent
Henry et al.

(10) Patent No.: US 7,027,656 B2
(45) Date of Patent: Apr. 11, 2006

(54) COMPRESSION OF DIGITAL DATA AND CODING OF THE COMPRESSED DATA IN ORDER TO PROTECT THEM AGAINST TRANSMISSION ERRORS

(75) Inventors: Félix Henry, Rennes (FR); Frédérique Ehrmann, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 541 days.

(21) Appl. No.: 09/852,660

(22) Filed: May 11, 2001

(65) Prior Publication Data

US 2002/0054644 A1    May 9, 2002

(30) Foreign Application Priority Data

May 19, 2000  (FR) .................................. 00 06443

(51) Int. Cl.
*G06K 9/36*    (2006.01)
(52) U.S. Cl. .................................................. 382/239
(58) Field of Classification Search ................ 382/239, 382/240, 232, 249–253; 341/50, 51, 65, 341/107; 375/340
See application file for complete search history.

(56) References Cited

U.S. PATENT DOCUMENTS

| | | | |
|---|---|---|---|
| 4,394,774 A | 7/1983 | Widergren et al. | 382/56 |
| 5,761,248 A | 6/1998 | Hagenauer et al. | 375/340 |
| 5,978,517 A | 11/1999 | Henry et al. | 382/253 |
| 5,995,027 A | 11/1999 | Henry | 341/50 |
| 6,215,422 B1 | 4/2001 | Henry et al. | 341/51 |
| 6,266,451 B1 | 7/2001 | Charrier et al. | 382/249 |
| 6,333,705 B1 | 12/2001 | Amonou et al. | 341/107 |

FOREIGN PATENT DOCUMENTS

| | | |
|---|---|---|
| EP | 0 511 139 A1 | 10/1992 |
| EP | 0 586 074 A2 | 3/1994 |
| EP | 0 586 074 A3 | 3/1994 |
| FR | 2 702 580 | 9/1994 |

OTHER PUBLICATIONS

Fei X et al: "Turbo-Codes Used for Compressed Image Transmission Over Frequency Selective Fading Channel". Global Communications Conference (Globecom), US, New York, IEEE, Nov. 3, 1997, pp. 629-633.
"Technical Description of Turbo Product Codes—Version 4.0", Technical Description, Jun. 1999, pp. 23-28.
Berrou C et al: "Near Shannon Limit Error—Correcting Coding and Decoding: Turbo-Codes (1)", Proceedings of the International Conference on Communications (ICC), US, New York, IEEE, vol. 2/3, May 23, 1993, pp. 1064-1070.
Bill Thomson: "Error Codes Widen Design Window", EETimes.com, Mar. 13, 2001, pp. 1-2.
Claude Berrou, et al., Near Shannon Limit Error—Correcting Coding and Decoding: Turbo-Codes (1); pp. 1064-1070, 1993.

*Primary Examiner*—Vikkram Bali
(74) *Attorney, Agent, or Firm*—Fitzpatrick, Cella, Harper & Scinto (57) ABSTRACT

The invention concerns a method of adjusting at least one parameter for the compression of data representing physical quantities, the compressed data then being coded according to a coding mode in order to protect it from transmission errors. The methods includes, as from a required compressed data size, determining at least one characteristic of the coding mode, determining an effective size of the compressed data according to the required size and the at least one characteristic, and adjusting at least one compression parameter according to the effective size.

33 Claims, 5 Drawing Sheets

COMPRESSION OF DIGITAL DATA AND CODING OF THE COMPRESSED DATA IN ORDER TO PROTECT THEM AGAINST TRANSMISSION ERRORS

The present invention concerns a method and device for compressing digital data and coding the compressed data in order to protect them against transmission errors.

Compression of the signal makes it possible to transmit or respectively store the digital data whilst reducing the transmission time or transmission rate or respectively reducing the memory space used.

Moreover, the protection of digital data against transmission errors makes it possible to obtain data which are not altered after transmission thereof. Known techniques for protecting digital data against transmission errors are for example turbocoding (described in the article by Berrou, Glavieux and Thitimajshima: "Near-Shannon limit error-correcting coding and decoding: turbo-codes", ICC 93, Geneva) or convolutional coding (described in the book by Shu Lin and Daniel J. Costello, Jr., "Error Control Coding: Fundamentals and Applications", Prentice-Hall Series in Computer Applications in Electrical Engineering, Franklin F. Kuo, Editor, 1983).

In this context, the invention concerns more particularly the control of the throughput of the processed data, that is to say the ability to attain a predetermined compressed file size, this size being adapted to the subsequent transmission error protection coding.

In order to compress a fixed image, a conventional data compression method is for example the method normally referred to as JPEG (from the English Joint Photographic Expert Group). This method does not make it possible to effect a control of the throughput. This is because the user can only choose a quality factor which indicates approximately the compression ratio, since the higher the quality factor the lower the compression ratio. However, it is not possible to choose the size of the compressed file, except by carrying out a series of tests with different quality factors, in order to obtain the desired size.

With other compression techniques, it is on the other hand possible to specify before compression the required compressed file size, to within a bit. This file will then be obtained more rapidly than with an iterative method as previously described.

For example, the JPEG2000 method, still for fixed images, makes it possible to generate a compressed file whose size has been specified in advance.

The present invention aims to combine a digital compression including a possibility of specifying the size of the compressed file, with a coding of the compressed data in order to protect them against transmission errors, adapting the compressed file to the constraints related to the transmission error protection coding.

To this end, the invention proposes a method of adjusting at least one parameter for the compression of data representing physical quantities, the compressed data then being coded according to a coding mode in order to protect them against transmission errors, characterised in that it includes, as from a required compressed data size, the steps of:

determining at least one characteristic of the coding mode, determining an effective size of the compressed data according to the required size and said at least one characteristic, adjusting at least one compression parameter according to the effective size.

Correlatively, the invention concerns a device for adjusting at least one parameter for compressing data representing physical quantities, the compressed data then being coded according to a coding mode in order to protect them against transmission errors, characterised in that it has:

means of determining at least one characteristic of the coding mode, means of determining an effective size of the compressed data according to a required compressed data size and said at least one characteristic, means of adjusting at least one compression parameter according to the effective size.

The invention also proposes a method of compressing data representing physical quantities, and coding the compressed data in order to protect them against transmission errors, characterised in that it includes, as from a required compressed data size, the steps of:

determining at least one characteristic of the coding mode, determining an effective size of the compressed data according to the required size and said at least one characteristic, adjusting at least one compression parameter according to the effective size, compressing the data, coding the compressed data.

Correlatively, the invention proposes a device for compressing data representing physical quantities, and coding the compressed data in order to protect them against transmission errors, characterised in that it has:

means of determining at least one characteristic of the coding mode, means of determining an effective size of the compressed data according to a required compressed data size and said at least one characteristic, means of adjusting at least one compression parameter according to the effective size, means of compressing the data, means of coding the compressed data.

By virtue of the invention, the size of the compressed file is adapted to the constraints of the transmission error protection coding, and thus the quantity of useful data compressed and then protected against transmission errors is maximised.

Consequently, for a given quantity of compressed data, the invention makes it possible to maximise the quality of the decoded data.

According to a preferred characteristic, the required size is determined automatically, and notably the required size is determined according to the constraints related to the subsequent decoding and compression of the data. Thus the characteristics of both the compression and coding and the decoding and decompression are exploited in order to adapt the compression and obtain a data quality which is as good as possible after processing.

According to a preferred characteristic, the coding mode processes the data by groups of predetermined length, and said at least one characteristic of the coding mode is the predetermined length. Thus, for example, the adding of padding bits, which would otherwise be necessary to form groups of predetermined length, is avoided.

According to preferred alternative characteristics, the coding mode is a turbocoding and the characteristic is an interleaving length of the turbocoding, or the coding mode is a convolutional coding.

According to a preferred characteristic, the adjustment of at least one compression parameter is a control of the throughput of the compressed data in order to obtain the effective size.

According to a preferred characteristics, combined or alternative, the compression parameter is the effective size, the resolution of the data after their decompression, or a quantisation step.

According to a preferred characteristic, the effective size is an integer multiple of the interleaving length. Thus the number of bits added during the turbocoding, these added bits not being useful data, is minimised.

According to a preferred characteristic, the effective size is determined by rounding the required size. The user then obtains a file whose size is very close to that which he has specified.

The adjustment or compression and coding device has means of implementing the above characteristics.

The invention also concerns a digital apparatus including the adjustment or compression and coding device, or means of implementing the adjustment or compression and coding method. This digital apparatus is for example a digital photographic apparatus, a digital camcorder, a scanner, a printer, a photocopier, or a facsimile machine. The advantages of the device and of the digital apparatus are identical to those disclosed above.

The present invention also concerns a information storage means, such as floppy disk or a CD-ROM. The information storage means, which can be read by a computer or microprocessor, integrated or not into the device, possibly removable, stores a program implementing the throughput control or compression and turbocoding method.

The characteristics and advantages of the present invention will emerge more clearly from a reading of a preferred embodiment illustrated by the accompanying drawings, in which.

Figure 1:
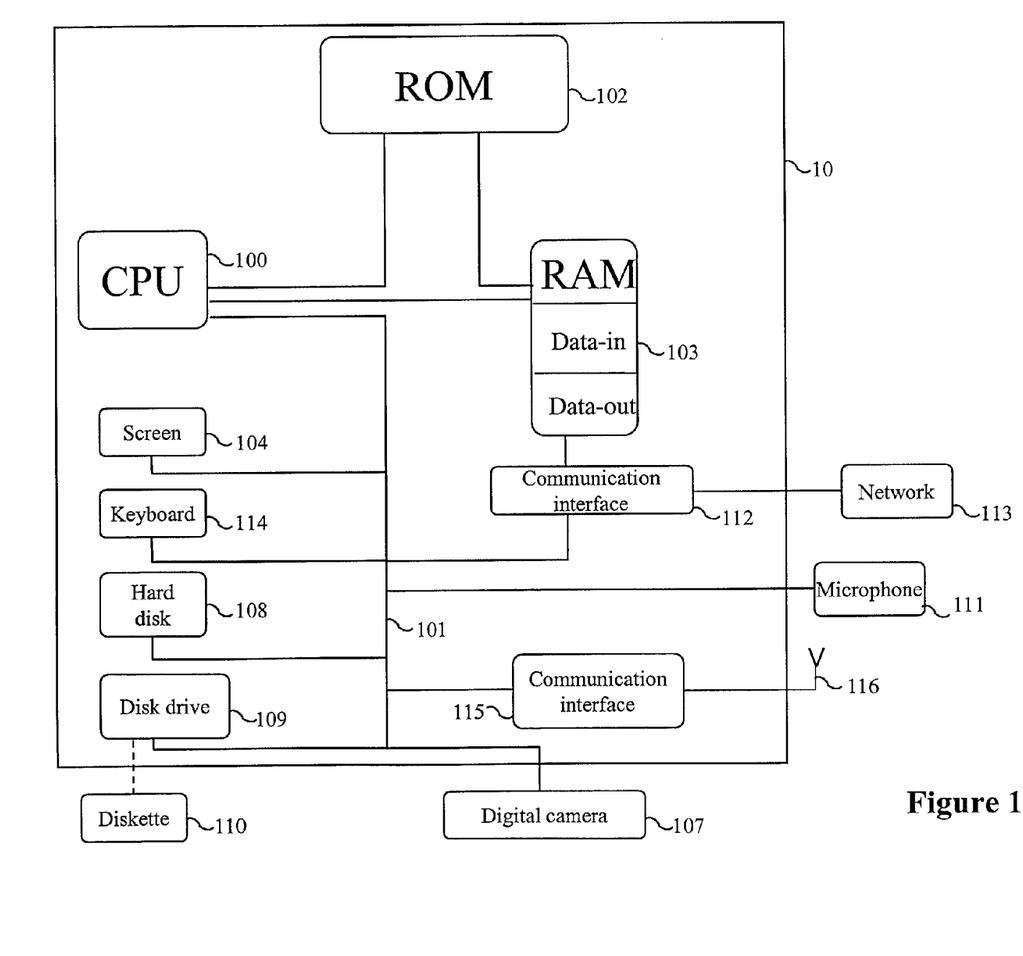
FIG. 1 is an embodiment of a device implementing the invention.

According to the chosen embodiment depicted in FIG. 1, a device implementing the invention is for example a microcomputer 10 connected to different peripherals, for example a digital camera 107 (or a scanner, or any means of acquiring or storing an image) connected to a graphics card and supplying information to be processed according to the invention.

The device 10 has a communication interface 112 connected to a network 113 able to transmit digital data to be processed or conversely to transmit data processed by the device.

A second communication interface 115 is connected to an antenna 116 for sending and receiving data.

The device 10 also has a storage means 108 such as for example a hard disk. It also has a drive 109 for a disk 110. This disk 110 can be a diskette, a CD-ROM, or a DVD-ROM, for example. The disk 110, like the disk 108, can contain data processed according to the invention as well as the program or programs implementing the invention which, once read by the device 10, will be stored on the hard disk 108. According to a variant, the program enabling the device to implement the invention can be stored in a read only memory 102 (referred to as ROM in the drawing). In a second variant, the program can be received in order to be stored in an identical manner to that described previously by means of the communication network 113.

The device 10 is connected to a microphone 111. The data to be processed according to the invention will in this case be the audio signal.

This same device has a screen 104 for displaying the data to be processed or serving as an interface with the user, who can thus parameterise certain processing modes, by means of the keyboard 114 or any other means (a mouse for example).

The central unit 100 (referred to as CPU on the drawing) executes the instructions relating to the implementation of the invention, instructions stored in the read only memory 102 or in the other storage elements. On powering up, the processing programs stored in a non-volatile memory, for example the ROM 102, are transferred into the random access memory RAM 103, which will then contain the executable code of the invention as well as registers for storing the variables necessary for implementing the invention.

In more general terms, an information storage means which can be read by a computer or microprocessor, integrated or not into the device, possibly removable, stores a program implementing the method according to the invention.

The communication bus 101 affords communication between the different elements included in the microcomputer 10 or connected to it. The representation of the bus 101 is not limitative and in particular the central unit 100 is able to communicate instructions to any element of the microcomputer 10 directly or by means of another element of the microcomputer 10.

Figure 2:
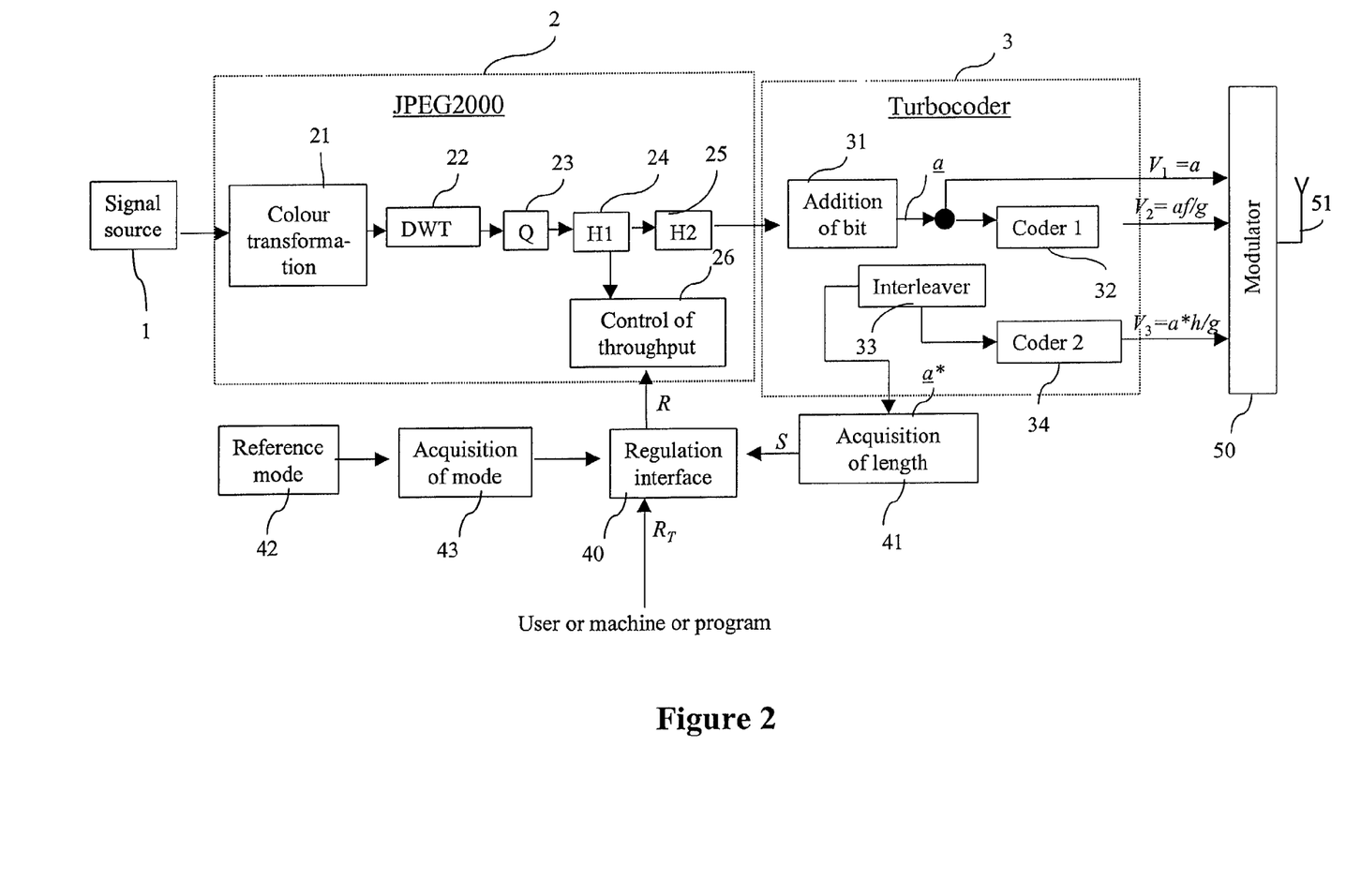
FIG. 2 depicts a coding device according to the invention.

With reference to FIG. 2, one embodiment of the coding device according to the invention is intended to code a digital signal for the purpose on the one hand of compressing it and on the other hand of protecting it against transmission errors. The coding device is integrated into an apparatus, which is for example a digital photographic apparatus, a digital camcorder, a scanner, a printer, a photocopier, a facsimile machine, a database management system or a computer.

The device according to the invention includes a signal source 1, here for an image signal IM, whether a fixed image or an image sequence. In general terms, the signal source either contains the digital signal, and includes for example a memory, a hard disk or a CD-ROM, or converts an analogue signal into a digital signal, and is for example an analogue camcorder associated with an analogue to digital converter. The image source 1 generates a series of digital samples representing an image IM. The image signal IM is a series of digital words, for example bytes. Each byte value represents a pixel of the image IM, here with 256 levels of grey or in colour.

An output of the signal source I is connected to a data compression circuit 2 which effects a coding, known per se, of the image, referred to as source coding. For example, for a fixed image, the coding used is in accordance with the standard JPEG2000 (in English Joint Photographic Expert Group), currently being produced and a description of which is available via the Internet at the address http://www.jpeg.org/cd15444-1.pdf.

The circuit 2 includes a colour transformation circuit 21 which transforms the images from the red-green-blue system to the luminance-chrominance system.

The circuit 21 is connected to a Discrete Wavelet Transformation circuit 22, referred to as DWT. The circuit 22 transforms the data which it receives into wavelet coefficients. The circuit 22 is connected to a scalar quantisation circuit Q 23, which quantises the wavelet coefficients as quantisation symbols.

The circuit 23 is connected to a first entropic coding module H1 24, which codes the quantised data in accordance with a block coding without loss. Each block of coded data is associated with a size data item which expresses the contribution of the block to the increase in size of the compressed file and a distortion data item which expresses the contribution of the block to the decrease in distortion in the decoded image.

The entropic coding module H1 24 is connected to a second entropic coding module H2 25, which effects truncations in the blocks of data supplied by the module 24. These truncations are effected according to the contribution of each block of data to the increase in size of the file and to the reduction in distortion of the decoded image. Only the blocks which contribute the most to the decrease in distortion and the least to the increase in the file size are kept, until a total size is obtained which will be disclosed below.

The output of the compression circuit 2 is connected to the input of a channel coding circuit 3, here two-parity turbocoding in order to protect the data against transmission errors. Turbocoding is described in the article by Berrou, Glavieux and Thitimajshima: "Near-Shannon limit error-correcting coding and decoding: turbo-codes", ICC 93, Geneva.

A turbocoding circuit is conventionally constructed from the parallel concatenation of two recursive systematic convolutional coders and an interleaver.

The functioning of a convolutional coder can be depicted by a trellis.

As from its input, the turbocoding circuit 3 has a padding circuit 31. The circuit 31 supplies a sequence of binary symbols to be transmitted, or "to be coded", a. The function of the circuit 31 is to terminate the trellis by adding tail bits or padding bits so that these bits enable the coder to terminate in the required state, generally the state "0". The fact of knowing the final state of each coder, added to the fact that the initial state is also fixed, makes it possible to subsequently use the Maximum A Posteriori (MAP) decoding algorithm.

The circuit 31 is connected to a first recursive systematic convolutional coder 32, referred to as an RSC coder, which supplies, from the sequence a, two sequences $v_1$ and $v_2$ of symbols representing the sequence a.

The circuit 31 is also connected to an interleaver 33 which supplies, from the sequence a, an interleaved sequence a* whose symbols are the symbols of the sequence a, but in a different order. Different types of interleaver can be used: random permutation interleaver, or reverse permutation interleaver, a block interleaver, or an interleaver which may be uniform or not, a pseudo-random scrambler for example.

An interleaver processes the data which it receives by series of predetermined length S.

The interleaver 33 is connected to a second recursive systematic convolutional coder 34 which supplies, from the interleaved sequence a*, a third sequence, $v_3$, representing the sequence a.

The three sequences $v_1$, $v_2$ and $v_3$ are supplied to a modulating circuit 50, which performs conventional modulation, filtering and mapping processings, and possibly a transposed band modulation. The resulting signal is transmitted over a transmission channel by means of an antenna 51.

Parallel turbocodes have been considered here, but the invention applies, with adaptations within the capability of persons skilled in the art, to serial turbocodes and hybrid turbocodes (having a serial turbocoding part and a parallel turbocoding part).

The first coder 32 used here is a systematic coder, that is to say the sequence $v_1$ is identical to the sequence a.

The coder 32 uses a polynomial f(x) as a multiplier polynomial, the coder 34 uses a polynomial h(x) as a multiplier polynomial, and the coders 32 and 34 both use a polynomial g(x) as a divisor polynomial.

According to the invention, a regulation interface 40 reads a required data size $R_T$. The required size $R_T$ is for example defined by the user when he effects the compression control.

As a variant, the required size $R_T$ is not defined by the user, but is defined automatically. For example, the device which will receive the image fixes a maximum memory size, which is transmitted to the coder and which determines the required size $R_T$. This variant applies particularly in the case where the receiving device is a mobile telephone whose display memory is limited.

The regulation interface 40 then interrogates the interleaver by means of a length acquisition module 41, in order to know the length S of the interleaving. In a variant, the length S can be read in memory.

In order to optimise the network resource which will be used for transmitting the data, it is necessary to ensure that the actual size R of the compressed file is an integer multiple of the length S of the interleaver, that is to say R=k.S, where k is an integer.

In addition, the actual size R of the compressed file must be as close as possible to the desired size $R_T$. For this purpose, it is possible to round either to the multiple below or to the multiple above.

In order to choose the type of rounding, a predetermined reference mode, preferably able to be changed from one coding to the next by the user, is stored in a memory 42. The regulation interface interrogates the memory 42 by means of a mode acquisition module 43.

When the reference mode is "rounded to the multiple above", the actual size R=k.S will be such that k satisfies the condition: $(k-1).S < R_T \leq k.S$.

When the reference mode is "rounded to the multiple below", the actual size R=k.S will be such that k satisfies the condition: $k.S < R_T \leq (k+1).S$.

In practice, these two rounding modes correspond to two different applications.

In the case of rounding to the multiple above, the technical requirements related to the use of the turbocoder mean that additional resources will be used, in the case of extension of the signal with zero samples, in order to correspond to the multiple of the length S of the interleaver. In this configuration, there is an advantage in exploiting to the maximum this resource, which will in any event be used. The size of the compressed file is consequently increased from the required size $R_T$ to the maximum value, with the advantage of an improved quality of the image on decoding.

Rounding to the multiple below corresponds to the case where the requested size $R_T$ can in no circumstances be exceeded, for example if it is wished to store the compressed file in a memory area of limited size.

When the regulation interface 40 has calculated the actual size R of the compressed file, this size is transmitted to a throughput control module 26, which is connected to the two entropic coding modules 24 and 25. The coding of the image is achieved by the coding circuit 2, which then supplies a compressed file of size R to the turbocoder 3.

The turbocoder 3 codes the compressed file in order to protect it against transmission errors, and the data resulting therefrom are for example modulated and then transmitted over the transmission channel. It should be noted that the efficiency of the turbocoding is ⅓, that is to say, if the integer n represents the number of padding bits, the size of the file output from the turbocoder is 3×(R+n).

In a variant, the length S of the interleaver 33 can be parameterised. It is for example chosen from amongst a predetermined range of values. According to another variant, the regulation interface enables the user only to choose one size amongst multiple values of the length of interleaver S. It is then not necessary to effect a rounded calculation.

Figure 3:
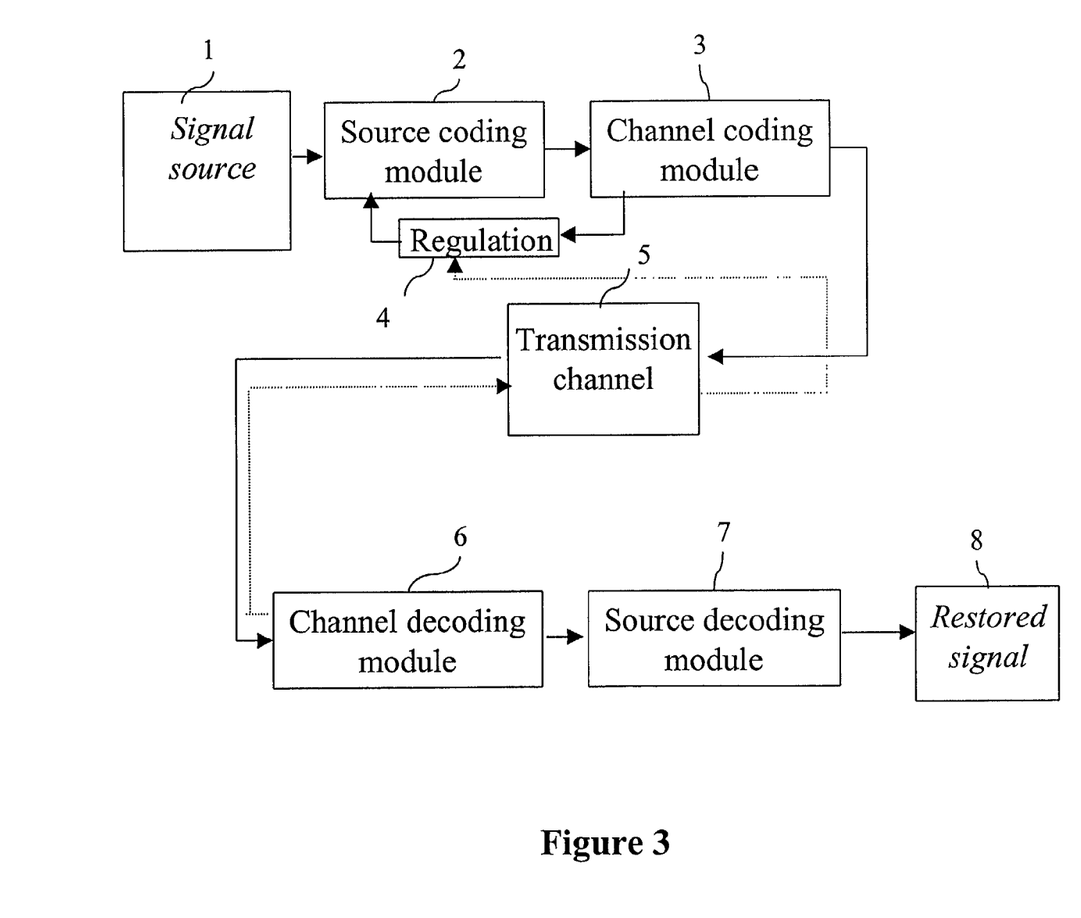
FIG. 3 depicts a system including a coding device according to the invention and an associated decoding device.

With reference to FIG. 3, a system in which the invention is implemented includes the signal source 1, the source coding module 2, the channel coding module 3 and the regulation module 4, an example embodiment of which has just been disclosed.

The channel coding module communicates with a corresponding channel decoding module 6, via a transmission channel 5. The module 6 is connected to a source decoding module 7 which delivers a restored signal, which is for example displayed, in the case of an image, by conventional display means 8.

Figure 4:
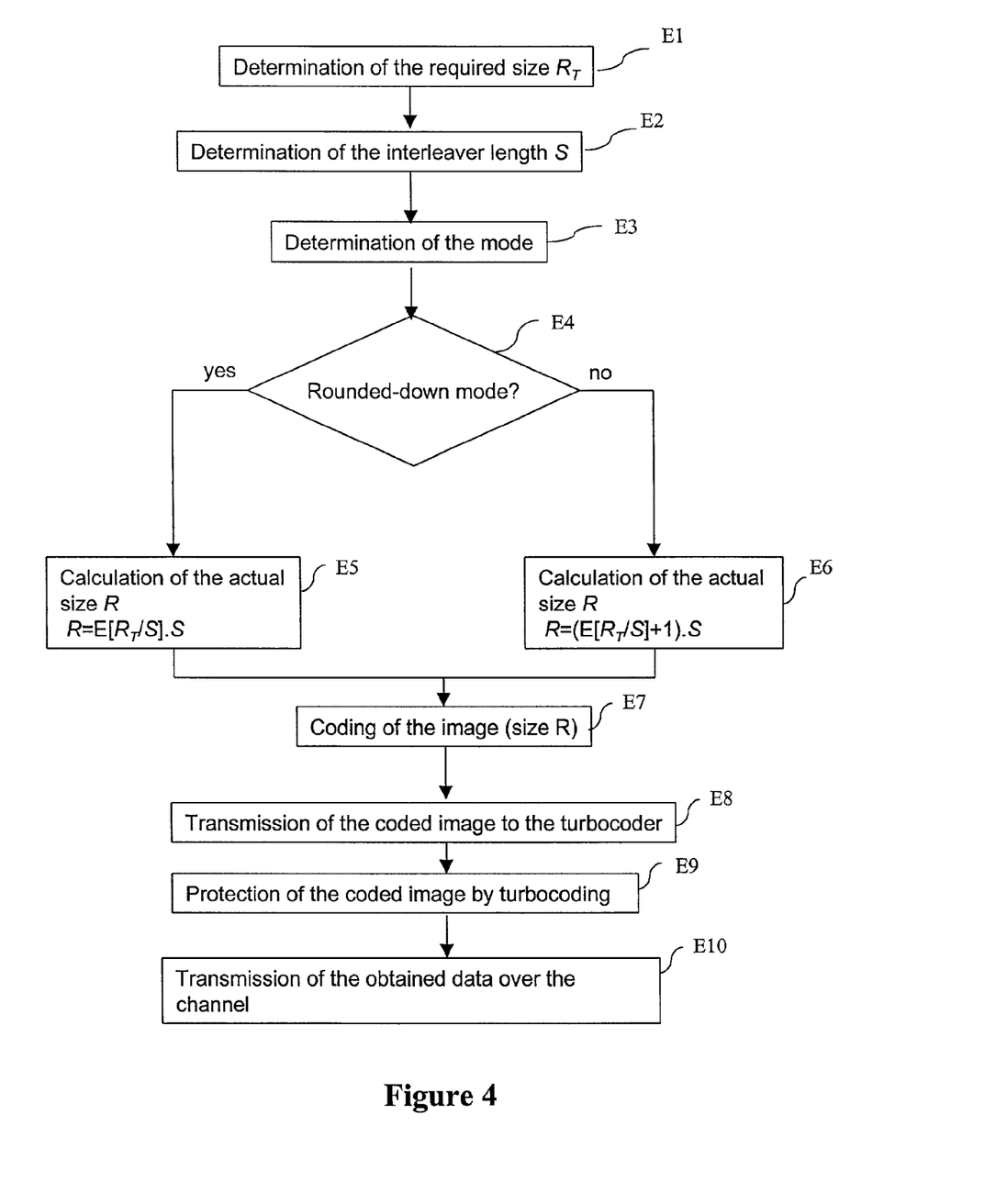
FIG. 4 is an embodiment of the coding method according to the invention.

FIG. 4 depicts an embodiment of the method of coding an image, according to the invention. This method is implemented in the coding device of FIG. 1 and includes steps E1 to E10.

The method is produced in the form of an algorithm which can be stored in whole or in part in any information storage means capable of cooperating with the microprocessor. This storage means can be read by a computer or microprocessor. This storage means is integrated or not into the device, and can be removable. For example, it can include a magnetic tape, a diskette or a CD-ROM (fixed-memory compact disc).

The method includes the compression of the image and the turbocoding of the compressed image, and the control of throughput according to the invention.

Step E1 is the determination of the required size $R_T$.

The following step E2 is the determination of the length S of the interleaver. This length can take a unique value, or a value selected from amongst predetermined values.

The following step E3 is the determination of the mode for calculating the actual size: by rounding down or rounding up.

The following step E4 is a test on the chosen mode.

If the mode chosen is the rounding-down mode, then step E4 is followed by step E5, at which the actual size R is calculated according to the formula:

$R = E[R_T/S].S$, where $E[\ldots]$ denotes the integer part.

If on the other hand the mode chosen is the rounding-up mode, then step E4 is followed by step E6, at which the actual size R is calculated according to the formula:

$R = (E[R_T/S]+1).S$, where $E[\ldots]$ denotes the integer part.

Step E5 or step E6 is followed by step E7, which is the coding of the image. As disclosed previously, this coding is for example a coding of the JPEG2000 type, including a throughput control. The result of this coding is a compressed file of size R, which is transmitted to the turbocoder at the following step E8.

The following step E9 is the protection of the compressed image against transmission errors, by turbocoding.

The following step E10 is the transmission of the compressed and then turbocoded image over the transmission channel, after a possible modulation.

The decoding of the data is conventional and consequently will not be detailed here. It includes a turbodecoding followed by a decompression of the received data.

Figure 5:
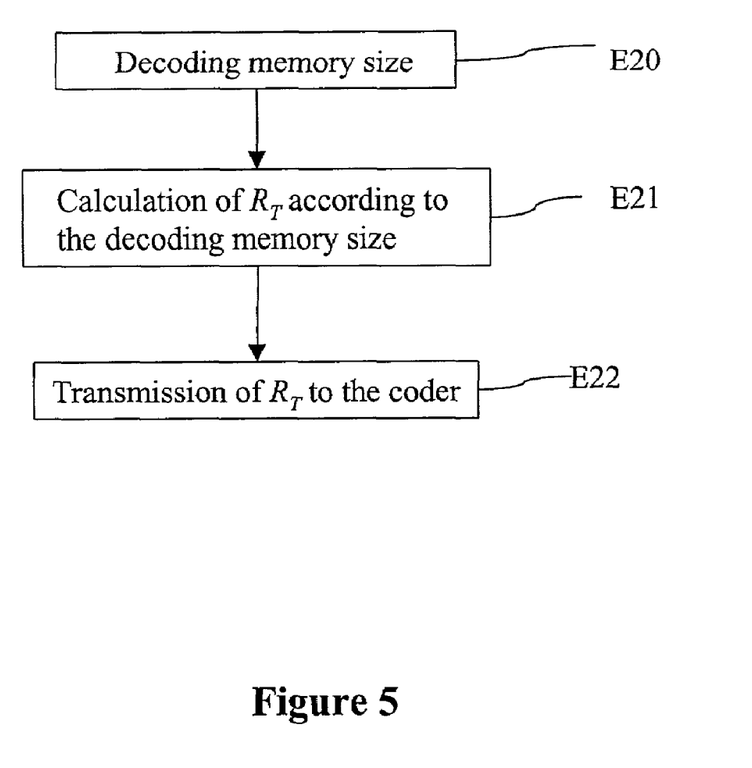
FIG. 5 depicts a method of determining an order of size required, according to the present invention.

FIG. 5 depicts an embodiment of the method of determining an order of size required by the decoding device including the modules 6, 7 and 8. (FIG. 3).

The method is implemented in the form of an algorithm which can be stored in whole or in part in any information storage means capable of cooperating with the microprocessor. This storage means can be read by a computer or microprocessor. This storage means is integrated or not into the device, and may be removable. For example, it may include a magnetic tape, a diskette or a CD-ROM (fixed-memory compact disc).

Step E20 is the determination of the memory size available for decoding. As disclosed previously, this size can be determined by the display size of the image to be restored. This size is either calculated or read from memory.

The following step E21 is the calculation of the required size $R_T$ according to the previously determined memory size.

The following step E22 is the transmission of the required size $R_T$ to the coder including the modules 2, 3 and 4, as shown diagrammatically by the dotted line in FIG. 3.

As a variant, the memory size determined at step E21 is transmitted to the coder and the required size $R_T$ is calculated in the coder, according to the memory size transmitted.

Naturally, the present invention is in no way limited to the embodiments described and depicted, but quite the contrary encompasses any variant within the capability of a person skilled in the art.

In particular, the invention has been described with reference to fixed images, but it applies to any type of digital data, for example video data.

Moreover, the compression parameter adjustment can be effected on the resolution of the data after their decompression, or on a quantisation step, as an alternative to or combined with the adjustment described on the effective size.

Finally, the coding mode intended to protect the data against transmission errors can be convolutional coding.

What is claimed is:

1. A method of adjusting at least one parameter for the compression of data representing physical quantities into compressed data, the method including the steps of:
   determining a required size for the compressed data before coding according to a coding mode in order to protect the compressed data from transmission errors;
   determining at least one characteristic of said coding mode;
   determining an effective size of the compressed data according to the required size and the at least one characteristic; and
   adjusting at least one compression parameter according to the effective size.

2. A method of compressing data representing physical quantities into compressed data, and coding the compressed data in order to protect the compressed data from transmission errors, the method including the steps of:
   determining a required size for the compressed data before coding according to a coding mode in order to protect the compressed data from transmission errors;
   determining at least one characteristic of said coding mode;
   determining an effective size of the compressed data according to the required size and the at least one characteristic;

adjusting at least one compression parameter according to the effective size;

compressing the data; and coding the compressed data.

3. The method according to claim 1 or 2, in which the required size is determined automatically.

4. The method according to claim 1 or 2, in which the required size is determined according to constraints related to subsequent decoding and decompression of the data.

5. The method according to claim 1 or 2, in which said coding mode processes the data by groups of predetermined length, and the at least one characteristic of said coding mode is the predetermined length.

6. The method according to claim 1 or 2, in which said coding mode is a turbocoding and the characteristic is an interleaving length of the turbocoding.

7. The method according to claim 1 or 2, in which said coding mode is a convolutional coding.

8. The method according to claim 1 or 2, in which the adjustment of at least one compression parameter is a control of the throughput of the compressed data in order to obtain the effective size.

9. The method according to claim 1 or 2, in which the compression parameter is the effective size.

10. The method according to claim 1 or 2, in which the compression parameter is the resolution of the data after decompression.

11. The method according to claim 1 or 2, in which the compression parameter is a quantization step.

12. The method according to claim 6, in which the effective size is an integer multiple of the interleaving length.

13. The method according to claim 1 or 2, in which the effective size is determined by rounding the required size.

14. An apparatus for processing a digital image, having means adapted to implement the method according to claim 1 or 2.

15. A computer readable medium storing a program for implementing the method according to claim 1 or 2.

16. The computer readable medium according to claim 15, in which said computer readable medium is a floppy disk or a CD-ROM.

17. A device for adjusting at least one parameter for compressing data representing physical quantities into compressed data, comprising:

means of determining a required size for the compressed data before coding according to a coding mode in order to protect the compressed data from transmission errors;

means of determining at least one characteristic of the coding mode;

means of determining an effective size of the compressed data according to the required compressed data size and the at least one characteristic; and means of adjusting at least one compression parameter according to the effective size.

18. A device for compressing data representing physical quantities, and coding the compressed data in order to protect the compressed data from transmission errors, comprising:

means of determining a required size for the compressed data before coding according to a coding mode in order to protect the compressed data from transmission errors;

means of determining at least one characteristic of said coding mode;

means of determining an effective size of the compressed data according to the required compressed data size and the at least one characteristic;

means of adjusting at least one compression parameter according to the effective size;

means of compressing the data; and means of coding the compressed data.

19. The device according to claim 17 or 18, adapted to determine the required size automatically.

20. The device according to claim 17 or 18, adapted to determine the required size according to constraints related to subsequent decoding and decompression of the data.

21. The device according to claim 17 or 18, in which said coding means process the data by groups of predetermined length, and the at least one characteristic of said coding mode is the predetermined length.

22. The device according to claim 17 or 18, in which said coding means use a turbocoding having a characteristic which is an interleaving length of the turbocoding.

23. The device according to claim 17 or 18, in which said coding means use a convolutional coding.

24. The device according to claim 17 or 18, in which said means of adjusting at least one compression parameter use a control of the throughput of the compressed data in order to obtain the effective size.

25. The device according to claim 17 or 18, adapted to consider a compression parameter which is the effective size.

26. The device according to claim 17 or 18, adapted to consider a compression parameter which is the resolution of the data after decompression.

27. The device according to claim 17 or 18, adapted to consider a compression parameter which is a quantization step.

28. The device according to claim 22, adapted to consider an effective size which is an integer multiple of the interleaving length.

29. The device according to claim 17 or 18, adapted to consider an effective size which is determined by rounding the required size.

30. The device according to claim 17, in which said determination and adjustment means are incorporated in:

a microprocessor, a ROM (read only memory) containing a program for processing the data, and a random access memory containing registers adapted to record variables modified during the running of said program.

31. A device according to claim 18, in which said determination, adjustment, compression and coding means are incorporated in:

a microprocessor, a ROM (read only memory) containing a program for processing the data, and a random access memory containing registers adapted to record variables modified during the running of said program.

32. A system including a device according to any one of claim 17 or 18, and a second corresponding data decoding and decompression device, in which the required size is determined according to constraints related to the decoding and decompression of the data.

33. An apparatus for processing a digital image, including the device according to claim 17 or 18.

* * * * *

UNITED STATES PATENT AND TRADEMARK OFFICE
CERTIFICATE OF CORRECTION

| | | |
|---|---|---|
| PATENT NO. | : 7,027,656 B2 | Page 1 of 1 |
| APPLICATION NO. | : 09/852660 | |
| DATED | : April 11, 2006 | |
| INVENTOR(S) | : Félix Henry et al. | |

It is certified that error appears in the above-identified patent and that said Letters Patent is hereby corrected as shown below:

ON THE TITLE PAGE [75] INVENTORS:

"Frédérique Ehrmann, Rennes (FR)" should read --Frédérique Ehrmann-Patin, Rennes (FR)--.

ON THE TITLE PAGE [57] ABSTRACT:

"methods" should read --method--.

COLUMN 3

Line 5, "characteristics," should read --characteristic,"--;
Line 27, "a" should be deleted; and
Line 28, "floppy" should read --a floppy--.

Signed and Sealed this

Thirty-first Day of October, 2006

JON W. DUDAS
*Director of the United States Patent and Trademark Office*